(12) United States Patent  (10) Patent No.: US 8,937,781 B1
Song et al.  (45) Date of Patent: Jan. 20, 2015

(54) CONSTANT FALSE ALARM RESONANCE DETECTOR

(71) Applicant: LSI Corporation, San Jose, CA (US)

(72) Inventors: Xiufeng Song, San Jose, CA (US); Jianzhong Huang, San Jose, CA (US); Fan Zhang, Milpitas, CA (US); Jun Xiao, Fremont, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/109,705

(22) Filed: Dec. 17, 2013

Related U.S. Application Data

(60) Provisional application No. 61/916,618, filed on Dec. 16, 2013.

(51) Int. Cl.
*G11B 5/60* (2006.01)

(52) U.S. Cl.
CPC .................................. *G11B 5/6076* (2013.01)
USPC .............................................. 360/55; 360/75

(58) Field of Classification Search
None
See application file for complete search history.

(56) References Cited

U.S. PATENT DOCUMENTS

| | | | |
|---|---|---|---|
| 4,715,257 A | 12/1987 | Hoshiai et al. | |
| 4,777,544 A | 10/1988 | Brown et al. | |
| 5,086,475 A | 2/1992 | Kutaragi et al. | |
| 5,111,727 A | 5/1992 | Rossum | |
| 5,377,058 A | 12/1994 | Good et al. | |
| 5,814,750 A | 9/1998 | Wang et al. | |
| 6,097,559 A | 8/2000 | Ottensen | |
| 6,191,901 B1 | 2/2001 | Carlson | |
| 6,519,102 B1 | 2/2003 | Smith et al. | |
| 6,937,424 B2 | 8/2005 | Chang et al. | |
| 7,016,131 B2 | 3/2006 | Liu et al. | |
| 7,038,875 B2 | 5/2006 | Lou et al. | |
| 7,158,325 B1 | 1/2007 | Hu et al. | |
| 7,222,289 B2 | 5/2007 | Hung | |
| 7,426,090 B2 * | 9/2008 | Yamashita et al. | 360/75 |
| 7,468,854 B2 * | 12/2008 | Yamashita et al. | 360/75 |
| 7,483,234 B2 * | 1/2009 | Shimozato | 360/75 |
| 7,633,696 B2 * | 12/2009 | Kassab | 360/75 |
| 7,830,369 B2 | 11/2010 | Kageyama et al. | |
| 7,835,104 B2 * | 11/2010 | Yamashita et al. | 360/75 |
| 8,098,451 B2 | 1/2012 | Graef | |

(Continued)

FOREIGN PATENT DOCUMENTS

| | | |
|---|---|---|
| EP | 2031759 | 3/2004 |
| WO | WO 02/093546 | 11/2002 |
| WO | WO 2010/014078 | 2/2010 |

OTHER PUBLICATIONS

Liu, et al., "Head Disk Spacing Variation Suppression via Active Flying Height Control" IEEE Instrumentation and Measurement Technology Conf. Budapest, Hungary May 21-23, 2001.

(Continued)

*Primary Examiner* — Wayne Young
*Assistant Examiner* — James L Habermehl
(74) *Attorney, Agent, or Firm* — Hamilton DeSanctis & Cha

(57) ABSTRACT

A contact detection system includes a comparator operable to compare a signal derived from a contact sensor with a threshold and to indicate contact when the signal is greater than the threshold, a parameter estimation circuit operable to estimate parameters of a probability density function based on the signal derived from the contact sensor, and a threshold calculator operable to calculate the threshold based at least in part on the parameters of the probability density function.

20 Claims, 4 Drawing Sheets

(56) References Cited

U.S. PATENT DOCUMENTS

| | | |
|---|---|---|
| 8,145,443 B2 | 3/2012 | Kang et al. |
| 8,300,349 B2 | 10/2012 | Mathew |
| 8,854,756 B1 * | 10/2014 | Song et al. ............... 360/55 |
| 2007/0268615 A1 | 11/2007 | McFadyen et al. |
| 2008/0071367 A1 | 3/2008 | Bergin |
| 2008/0151418 A1 * | 6/2008 | Cisewski et al. ............... 360/86 |
| 2012/0033323 A1 | 2/2012 | Mathew |
| 2012/0038998 A1 | 2/2012 | Mathew |
| 2012/0056612 A1 | 3/2012 | Mathew |
| 2012/0087035 A1 | 4/2012 | Graef |
| 2014/0268407 A1 * | 9/2014 | Daugela et al. ............... 360/75 |

OTHER PUBLICATIONS

U.S. Appl. No. 13/537,487, filed Jun. 29, 2012, Ming Jin, Unpublished.

U.S. Appl. No. 13/185,562, filed Jul. 19, 2011, Haitao Xia, Unpublished.

Wikipedia, URL: http://en.wikipedia.org/wiki/Skew_normal_distribution, retrieved Jul. 13, 2014.

* cited by examiner

CONSTANT FALSE ALARM RESONANCE DETECTOR

CROSS REFERENCE TO RELATED APPLICATIONS

The present application claims priority to (is a non-provisional of) U.S. Pat. App. No. 61/916,618, entitled "Constant False Alarm Resonance Detector", and filed Dec. 16, 2013 by Song et al, the entirety of which is incorporated herein by reference for all purposes.

FIELD OF THE INVENTION

The present invention is related to systems and methods for determining contact between two elements, and more particularly to systems and methods for determining contact between a head assembly and a storage medium.

BACKGROUND

Typical implementations of hard disk based storage devices utilize a thermal element to control the fly height of the read/write head. Heating the thermal element causes a distance between the read/write head and a storage medium to decrease. Where the heat generated by the thermal element is sufficient, the read/write head may be brought into contact with the storage medium. In some cases, this contact can damage one or more components of the storage device.

SUMMARY

Various embodiments of the present invention provide systems, apparatuses and methods for determining contact between two elements, and more particularly to systems and methods for determining contact between a head assembly and a storage medium.

In some embodiments, a contact detection system includes a comparator operable to compare a signal derived from a contact sensor with a threshold and to indicate contact when the signal is greater than the threshold, a parameter estimation circuit operable to estimate parameters of a probability density function based on the signal derived from the contact sensor, and a threshold calculator operable to calculate the threshold based at least in part on the parameters of the probability density function.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

The present invention is related to systems and methods for determining contact between two elements, and more particularly to systems and methods for determining contact or touch down between a read/write head assembly and a storage medium. The touch down should be detected to prevent physical damage and to estimate zero fly height.

A head to disk interface ("HDI") contact sensor is included in the read/write head assembly of a magnetic storage device. The head to disk interface sensor converts the temperature of the read/write head assembly into an electrical current, referred to herein as a head disk interface signal, which provides the opportunity to detect a touch down by analysis of the head disk interface signal. In some storage devices, as the read/write head assembly flies close to the storage medium, a resonance is generated in the mechanical system including the read/write head assembly. This resonance is employed to detect contact or touch down. However, such a resonance detector is an intuitive detector, which lacks the freedom of controllability and predictability that are key factors in system design. A constant false alarm resonance detector is disclosed herein which is capable of controlling and predicting the detection performance based on a threshold for detection setting.

The constant false alarm resonance detector can be based on various models of the probability density function (PDF) of modulation depth for the resonance detector, such as, but not limited to, a Gaussian fitting and a skew normal fitting. The Gaussian fitting has low computational complexity but less accuracy, in comparison to the skew normal fitting which is more accurate but with increased computational complexity. Whatever model is selected for the constant false alarm resonance detector, the modeling of the modulation depth probability density function enables the determination of a detection threshold setting that provides predictability and controllability, without knowledge of noise statistics for the system. In particular embodiments of the present invention, detection is a binary output with one binary value indicating contact and the other binary value indicating a normal (i.e., non-contact) condition.

Figure 1:
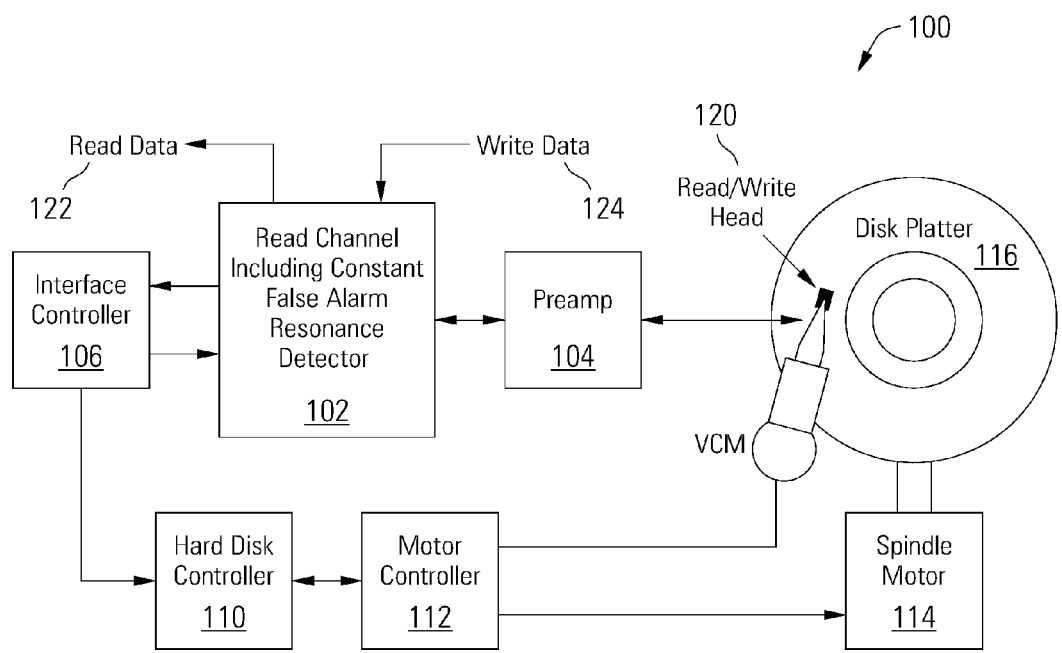
FIG. 1 shows a storage system including a read channel circuit having constant false alarm resonance based head contact sensor circuitry in accordance with some embodiments of the present invention.

Turning to FIG. 1, a storage system 100 is disclosed which includes a read channel circuit 102 with constant false alarm resonance-based head touch down sensor circuitry in accordance with some embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 digitizes and decodes the received analog signal to recreate the information originally written to disk platter 116. This data is provided as read data 122 to a receiving circuit. A write operation is substantially the opposite of the preceding read operation with write data 124 being provided to read channel circuit 102. This data is then encoded and written to disk platter 116.

In addition to sensing data stored on disk platter 116, read/write head assembly 120 provides for sensing contact between read/write head assembly 120 and disk platter 116 based on constant false alarm resonance detection.

It should be noted that in some embodiments storage system 100 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 100 is modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platter 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
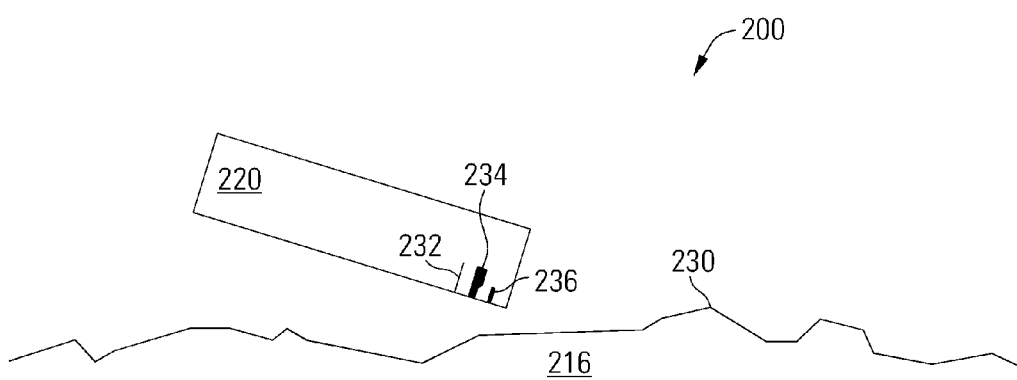
FIG. 2 graphically depicts an example read/write head disposed above the surface of a storage medium that may be used in relation to some embodiments of the present invention.

Turning to FIG. 2, a graphical depiction shows an example read/write head assembly 220 disposed above a surface 230 of a storage medium 216 that may be used in relation to different embodiments of the present invention. As shown, read write head assembly 220 includes a heater element 232 that is operable to control a distance between read write head assembly 220 and surface 230, a read/write head 234 operable to generate magnetic fields to store information on surface 230 and to sense magnetic information previously stored on surface 230, and a head to disk interface sensor 236 operable to sense contact between read/write head assembly 220 and surface 230.

Figure 3:
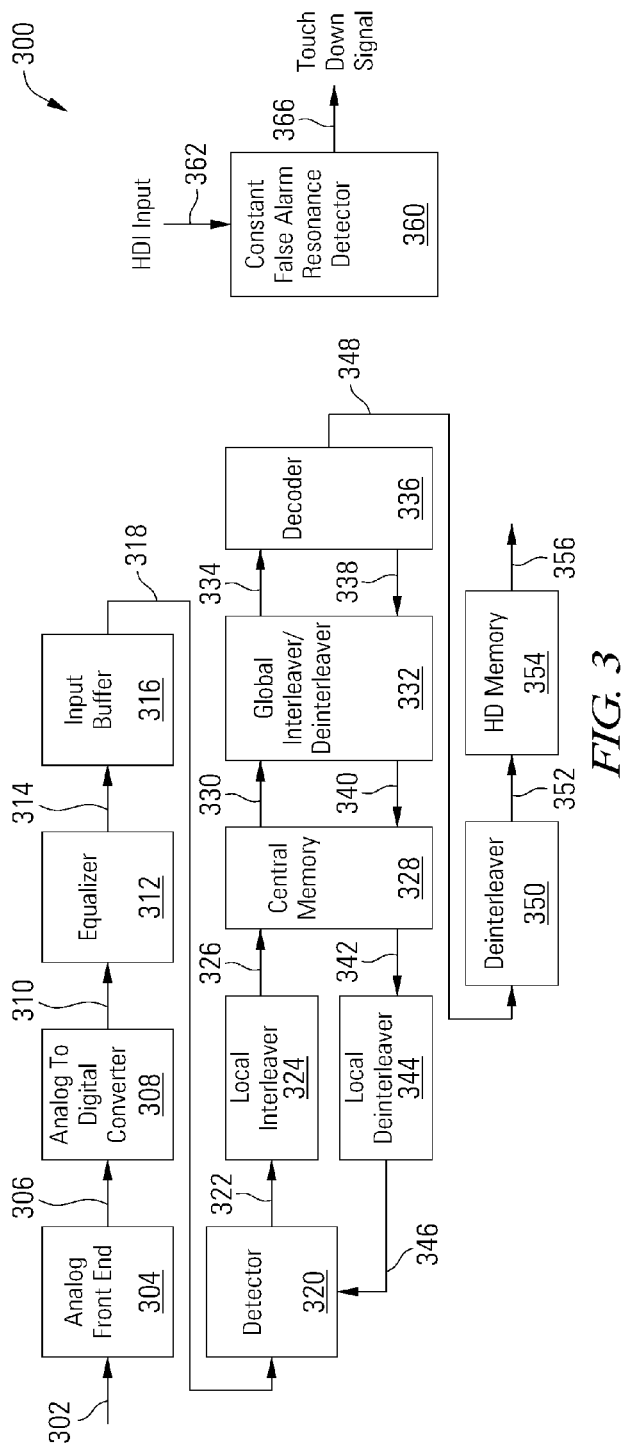
FIG. 3 shows a data processing circuit including a constant false alarm resonance contact detection circuit in accordance with some embodiments of the present invention.

Turning to FIG. 3, a data processing circuit 300 is shown that includes a constant false alarm resonance detector circuit 360 in accordance with some embodiments of the present invention. Data processing system 300 includes an analog front end circuit 304 that receives an analog signal 302. Analog front end circuit 304 processes analog signal 302 and provides a processed analog signal 306 to an analog to digital converter circuit 308. Analog front end circuit 304 can include, but is not limited to, an analog filter and an amplifier circuit as are known in the art. Based upon the disclosure provided herein, one of ordinary skill in the art will recognize a variety of circuitry that may be included as part of analog front end circuit 304. In some cases, analog signal 302 is derived from a read/write head assembly (e.g., 120) that is disposed in relation to a storage medium (e.g., 116). Based upon the disclosure provided herein, one of ordinary skill in the art will recognize a variety of sources from which analog input 302 may be derived.

Analog to digital converter circuit 308 converts processed analog signal 306 into a corresponding series of digital samples 310. Analog to digital converter circuit 308 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 310 are provided to an equalizer circuit 312. Equalizer circuit 312 applies an equalization algorithm to digital samples 310 to yield an equalized output 314. In some embodiments of the present invention, equalizer circuit 312 is a digital finite impulse response filter circuit as are known in the art. Equalized output 314 is stored in an input buffer 316 until a data detector circuit 320 is available to process stored codeword 318. In other cases, equalizer 312 includes sufficient memory to maintain one or more codewords until a data detector circuit 320 is available for processing. In some cases, equalized output 314 is received directly from a storage device in, for example, a solid state storage system. In such cases, analog front end circuit 304, analog to digital converter circuit 308 and equalizer circuit 312 are eliminated where the data is received as a digital data input.

Data detector circuit 320 is operable to apply a data detection algorithm to a received codeword or data set, and in some cases data detector circuit 320 can process two or more codewords in parallel. In some embodiments of the present invention, data detector circuit 320 is a Viterbi algorithm data detector circuit as is known in the art. In other embodiments of the present invention, data detector circuit 320 is a maximum a posteriori data detector circuit as is known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Data detector circuit 320 is started based upon availability of a data set from equalizer circuit 312 or from a central memory circuit 328.

Upon completion, data detector circuit 320 provides detector output 322. Detector output 322 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio (LLR) data as is known in the art. Detected output 322 is provided to a local interleaver circuit 324. Local interleaver circuit 324 is operable to shuffle sub-portions (i.e., local chunks) of the data set included as detected output 322 and provides an interleaved codeword 326 that is stored to central memory circuit 328. Interleaver circuit 324 can be any circuit known in the art that is capable of shuffling data sets to yield a re-arranged data set.

The interleaved codeword 326 is accessed from central memory 328 as a stored codeword 330 that is globally interleaved by a global interleaver/deinterleaver circuit 332, yielding an interleaved output 334. In some embodiments, the local interleaver circuit 324 is operable to rearrange data segments within a portion of a codeword, and the global interleaver/deinterleaver circuit 332 is operable to rearrange data segments across the entire codeword.

The interleaved output 334 is decoded in a decoder circuit such as, but not limited to, a low density parity check (LDPC) decoder 336. Based upon the disclosure provided herein, one of ordinary skill in the art will recognize other decoding algorithms that may be used in relation to different embodiments of the present invention. The decoder 336 applies a data decode algorithm to the interleaved output 334 in a variable number of local iterations internal to the decoder 336.

Where the decoder 336 fails to converge (i.e., fails to yield the originally written data set) and the number of local iterations through decoder 336 exceeds a threshold, the resulting decoded output 338 is globally deinterleaved in global interleaver/deinterleaver circuit 332 to yield a globally deinterleaved output 340 that is stored to central memory 328. The global deinterleaving reverses the global interleaving earlier applied to stored codeword 330. Once data detector circuit 320 is available, a previously stored deinterleaved output 342 is accessed from central memory 328 and locally deinterleaved by a deinterleaver circuit 344. Deinterleaver circuit 344 rearranges stored deinterleaved output 342 to reverse the shuffling originally performed by local interleaver circuit 324. A resulting deinterleaved output 346 is provided to data detector circuit 320 where it is used to guide subsequent detection of a corresponding codeword received as stored codeword 318. Thus, the term "global iteration" refers to the processing of data once through the data detector 320 and decoder 336 and the system elements between them during an iterative process in which the decoded output 338 is used to guide the data detector 320 during a subsequent global iteration. In contrast, local decoding iterations take place during an iterative decoding operation within the decoder 336.

Alternatively, where the decoded output converges (i.e., yields the originally written data set) in the decoder 336, the resulting decoded output is provided as an output codeword 348 to a deinterleaver circuit 350. Deinterleaver circuit 350 rearranges the data to reverse both the global and local interleaving applied to the data to yield a deinterleaved output 352, stored in hard decision (HD) memory 354. The stored hard decision output 356 can then be provided to an external controller (not shown) or used in any other suitable manner.

In addition, data processing circuit 300 includes a constant false alarm resonance detector 360 that is operable to assert a touch down signal 366 when contact between a read/write head assembly and a storage medium is sensed. Constant false alarm resonance detector 360 receives a head to disk interface input 362 that represents a temperature of a read/write head assembly. When a read/write head assembly contacts a storage medium, there is an increase in the temperature of the read/write head assembly that causes a corresponding change in head to disk interface input 362.

The mathematical framework of read/write head assembly touch down detection is based on a binary hypothesis test to select between two hypotheses $H_0$ and $H_1$, determining whether a data set in a sampled digital head to disk interface signal x corresponds to either $H_0$ or $H_1$:

$$H_0: x = w \quad \text{(Eq 1)}$$

$$H_1: x = s + w \quad \text{(Eq 2)}$$

where $H_0$ is the null hypothesis, signifying no touch down, and $H_1$ is the alternative hypothesis, signifying touch down. The sampled digital head to disk interface signal x for touch down detection can be represented as $x = [x_1, x_2, \ldots, x_M]^T$. Noise w can be represented as $w = [w_1, w_2, \ldots, w_M]^T$. The unknown signal component s contributed by touch down can be represented as $s = [s_1, s_2, \ldots, s_M]^T$.

The general formula of some embodiments of a touch down detector is as follows:

$$\begin{cases} \text{declare } \mathcal{H}_1\text{: if } \mathcal{F}(x) \geq T \\ \text{declare } \mathcal{H}_0\text{: if } \mathcal{F}(x) < T \end{cases} \quad (\text{Eq 3})$$

where F(x) is a general function for transforming data set x into a proper metric (e.g., a scalar) for comparison with a threshold T to detect a touch down.

In some embodiments of a resonance detector, the modulation depth z of a digital head to disk interface signal x is computed, then compared with a threshold to yield the detection result. The modulation depth z can be computed in some cases by dividing the data set in digital head to disk interface signal x into i segments and computing a sum $y_i$ of each segment as follows:

$$y_i = \sum_{k=1}^{K} |x_{(i-1)}K + k| \quad (\text{Eq 4})$$

then finding the minimum segmented sum $y_{min} \triangleq \min\{y_i|, 1 \leq i \leq N\}$ and the maximum segmented sum $y_{max} \triangleq \max\{y_i|, 1 \leq i \leq N\}$, and calculating the modulation depth z as:

$$z = \frac{y_{max} - y_{min}}{y_{max} + y_{min}} \quad (\text{Eq 5})$$

It is important that the performance of the detector be predictable and controllable. The false alarm rate is governed by the probability that the detector erroneously detects a touch-down when the read/write head assembly has not contacted the storage medium. The probability of false detection $P_{false}$ can be represented as follows:

$$P_{flase} = \int_T^{+\infty} (z|H_0) dz \quad (\text{Eq 6})$$

where T is the threshold for digital head to disk interface signal x to determine whether the read/write head assembly has contacted the storage medium, and where $p(z|H_0)$ is the probability density function of modulation depth z for digital head to disk interface signal x when the read/write head assembly has not contacted the storage medium. The probability of missed detection $P_{missed}$ can be represented as follows:

$$P_{missed} = \int_{+\infty}^{T} (z|H_1) dz \quad (\text{Eq 7})$$

where $p(z|H_1)$ is the probability density function of modulation depth z for digital head to disk interface signal x when the read/write head assembly has contacted the storage medium.

Figure 4:
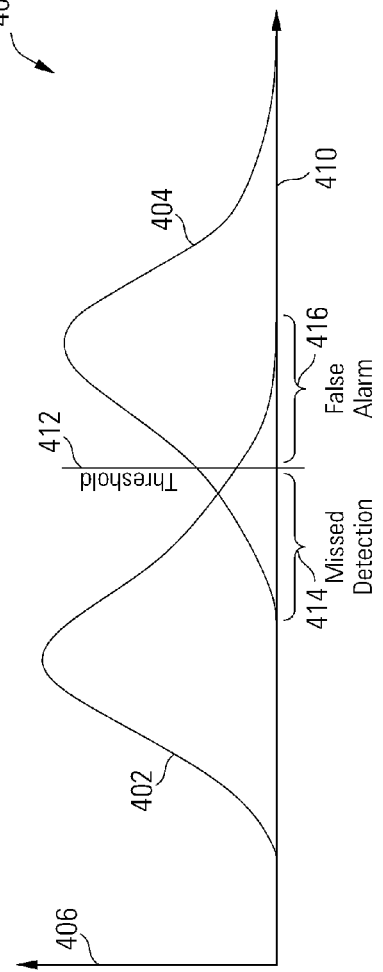
FIG. 4 is a graph of probability density functions for a head to disk interface sensor signal during no contact and contact conditions in accordance with some embodiments of the present invention.

The probability density functions $p(z|H_0)$ 402 and $p(z|H_1)$ 404 of digital head to disk interface signal x during no contact and during contact, respectively, are shown in graph 400 of FIG. 4. The y-axis 406 represents the likelihood that the digital head to disk interface signal x will have a value represented by the x-axis 410. The probability density function $p(z|H_0)$ 402 can thus be interpreted as the distribution of values of digital head to disk interface signal x when there is no contact between the read/write head assembly and the storage medium. The probability density function $p(z|H_1)$ 404 can be interpreted as the distribution of values of digital head to disk interface signal x when there is contact between the read/write head assembly and the storage medium.

Because there is a crossover between the probability density functions $p(z|H_0)$ 402 and $p(z|H_1)$ 404, there is an ambiguous region in which it cannot be absolutely determined whether contact has occurred based on the value of the digital head to disk interface signal x. The threshold T 412 is used to decide whether contact has occurred. When the digital head to disk interface signal x is greater than threshold T 412, the detector indicates that the read/write head assembly is in contact with the storage medium. When the digital head to disk interface signal x is less than threshold T 412, the detector indicates that the read/write head assembly is not in contact with the storage medium. However, if contact has occurred but the value of digital head to disk interface signal x is less than threshold T 412, when the digital head to disk interface signal x is in the left region 414 of probability density function $p(z|H_1)$ 404, the detector will not signal the contact, resulting in a missed detection. If contact has not occurred but the value of digital head to disk interface signal x is greater than threshold T 412, when the digital head to disk interface signal x is in the right region 416 of probability density function $p(z|H_0)$ 402, the detector will erroneously signal a contact, resulting in a false alarm.

If the value of threshold T 412 is adjusted using heuristics, the false alarm rate and missed detection rates are not predictable or controllable. By modeling the false alarm rate of the resonance detector as disclosed herein to set the threshold, the detector that would otherwise be an intuitive detector with unpredictable and uncontrollable false alarm rate and missed detection rate is transformed to a constant false alarm rate detector, in which the false alarm rate is predictable and controllable.

Again, the probability $P_{false}$ governing the false alarm rate is represented by Equation 6. By modeling the probability density function $p(z|H_0)$ 402 of $P_{false}$, the threshold can be set in a more informed fashion, and the false alarm rate can be predicted and controlled. The probability density function $p(z|H_0)$ 402 of $P_{false}$ is modeled in some embodiments using a Gaussian fitting. In some other embodiments, the probability density function $p(z|H_0)$ 402 of $P_{false}$ is modeled using a skew normal fitting. The methods of modeling the probability density function $p(z|H_0)$ 402 of $P_{false}$ are not dependent on a particular distribution of samples in digital head to disk interface signal x. Rather than calculating the segmented sum $y_i$ according to Equation 4 and then calculating the modulation depth z from segmented sum $y_i$ according to Equation 5, the modeling of probability density function $p(z|H_0)$ 402 of $P_{false}$ is performed directly in the z space.

The support domain of modulation depth z is [0,1] since:

$$0 = \frac{y_{max} - y_{min}}{y_{max} + y_{min}} \leq z = \frac{y_{max} - y_{min}}{y_{max} + y_{min}} \leq \frac{y_{max} - y_{min}}{y_{max} + y_{min}} = 1 \quad (\text{Eq 8})$$

The probability density function $p(z|H_0)$ 402 of modulation depth z does not depend on the variance of samples in digital head to disk interface signal x as modulation depth z is a ratio of two parameters with different linear operation. These characteristics of modulation depth z are general regardless of the distribution followed by digital head to disk interface signal x, including Gaussian and skew normal distributions. Thus, scaling the samples in digital head to disk interface signal x does not change the distribution of modulation depth z. The modulation depth z is relatively independent of the probability density function of samples in digital head to disk interface signal x because the resonance detector involves the window sum of samples in digital head to disk interface signal x per Equation 4. Based on the central limit theory, the sum of a group of independent random variables will converge to a Gaussian distribution. In other words, the sum operation will weaken the original probability density function diversity of x for y. Thus, the probability density function $p(z|H_0)$ 402 of modulation depth z for extreme cases of different distributions of digital head to disk interface signal x will share the same shape.

Figure 5:
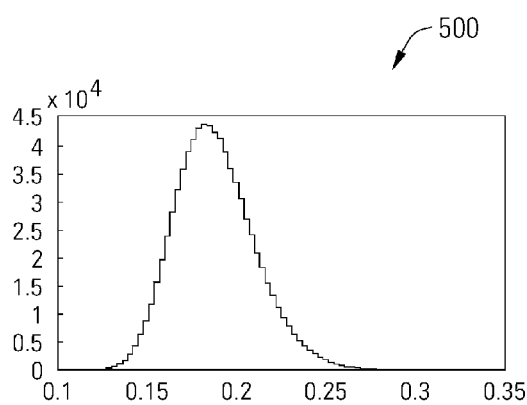
FIG. 5 is a histogram of samples in a digital head to disk interface signal according to a probability density function when there is no contact between a read head and a storage medium in accordance with some embodiments of the present invention.

The probability density function $p(z|H_0)$ 402 of modulation depth z can be modeled by performing a distribution fitting to a histogram 500 of points in modulation depth z. Such histogram data is shown in FIG. 5 for sample data for 800,000 computed samples of z, based on digital head to disk interface signal x that follows a Gaussian distribution. As shown in histogram 500, in this example the histogram 500 is not symmetrical, there is a skew to the left.

Figure 6:
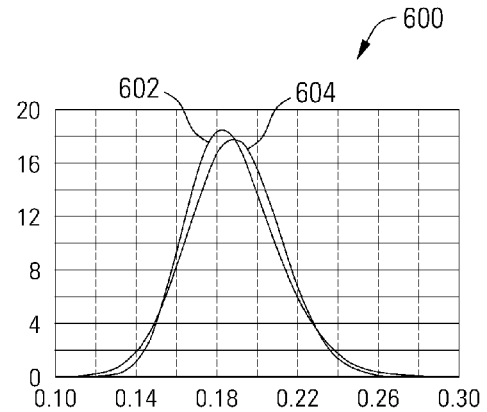
FIG. 6 is a graph of fitting results of a number of different distribution models for the histogram of FIG. 5 in accordance with some embodiments of the present invention.

A graph 600 is shown in FIG. 6 of the fitting results for two different distribution models on the histogram of FIG. 5 in accordance with some embodiments of the present invention. As can be seen in FIG. 6, the skew normal distribution 602 has a better fitting performance than the Gaussian distribution 604, and the accurate fitting performance of skew normal distributions holds true even if the digital head to disk interface signal x follows other distributions such as gamma and beta. However, the computational complexity of a skew normal distribution is higher than that for a Gaussian distribution. Thus, the constant false alarm resonance detector is based on a skew normal fitting in some embodiments where accuracy is more important than the cost of computational complexity. The constant false alarm resonance detector is based on a Gaussian fitting in some other embodiments where simplicity is more important than accuracy.

Figure 7:
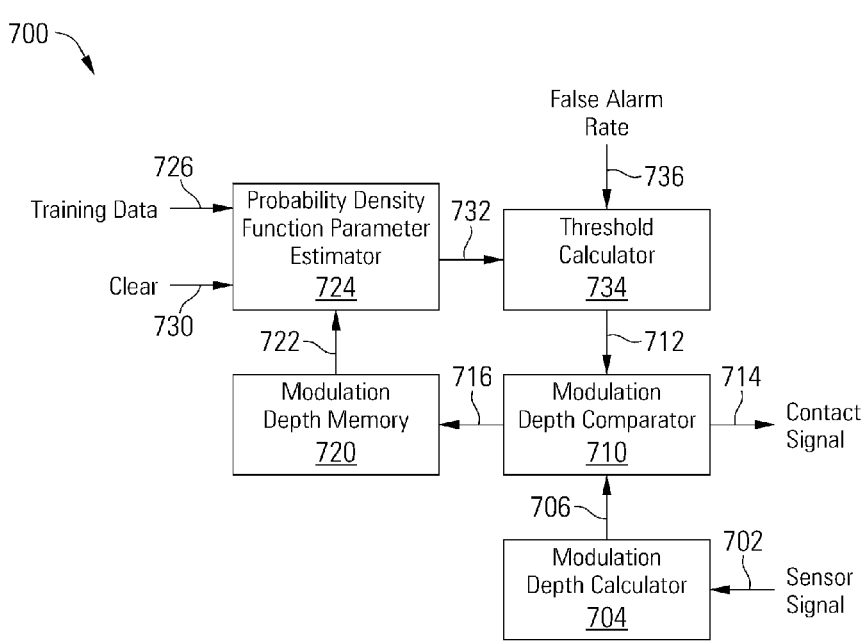
FIG. 7 depicts a block diagram of a constant false alarm resonance detector in accordance with some embodiments of the present invention.

Turning to FIG. 7, a constant false alarm resonance detector 700 is depicted in accordance with some embodiments of the present invention. The constant false alarm resonance detector 700 computes a threshold 712 based on a model of the probability density function $p(z|H_0)$ of modulation depth z, generated by estimating parameters of the probability density function. The constant false alarm resonance detector 700 thus provides predictability and controllability of the false alarm rate. In some embodiments, the false alarm rate can be controlled by a false alarm rate control signal 736 which, for example, can request fewer false alarms at the risk of more missed contact detections, or more false alarms with fewer missed detections.

A sensor signal 702, also referred to as digital head to disk interface signal x, is provided to a modulation depth calculator circuit 704. The sensor signal 702 carries digital samples in some embodiments, captured from an analog to digital converter (not shown) based on an analog signal from a head to disk interface sensor (e.g., 236) that is operable to sense contact between a read/write head assembly (e.g., 220) and the surface (e.g., 230) of a storage medium. The sensor signal 702 can be any suitable sensor for providing an electrical signal that changes state based on contact with a storage medium. Based upon the disclosure provided herein, one of ordinary skill in the art will recognize a variety of sources from which sensor signal 702 can be derived.

The modulation depth calculator circuit 704 is operable to calculate the modulation depth z 706, based on the sensor signal 702. In some embodiments, the modulation depth calculator circuit 704 calculates the modulation depth z 706 according to Equations 4 and 5. Based upon the disclosure provided herein, one of ordinary skill in the art will recognize a variety of modulation depth calculation circuits that may be used in relation to different embodiments of the present invention. The modulation depth z 706 is provided to a modulation depth comparator 710, which compares the modulation depth z 706 with threshold 712. If the modulation depth z 706 is greater than threshold 712, the modulation depth comparator 710 indicates that contact has been detected between the read/write head assembly and the storage medium, asserting contact signal 714. If the modulation depth z 706 is less than threshold 712, the modulation depth comparator 710 stores the no-contact modulation depth z 716 in modulation depth memory 720 for use in computing threshold 712. The modulation depth memory 720 thus stores only the no-contact modulation depth z 716 that is calculated based on a sensor signal 702 when there is no contact between the read/write head assembly and the storage medium. The modulation depth comparator 710 can be any suitable circuit for comparing modulation depth z 706 with threshold 712. Based upon the disclosure provided herein, one of ordinary skill in the art will recognize a variety of modulation depth comparator circuits that may be used in relation to different embodiments of the present invention.

A probability density function parameter estimator 724 estimates the probability density function parameters 732 for modulation depth z using a particular probability density function fitting. In some embodiments, the constant false alarm resonance detector 700 is adapted to apply a skew normal fitting in probability density function parameter estimator 724. In some other embodiments, the constant false alarm resonance detector 700 is adapted to apply a Gaussian fitting in probability density function parameter estimator 724. The constant false alarm resonance detector 700 is not limited to any particular fitting. The probability density function parameter estimator 724 initially estimates the parameters of the probability density function based on training data 726 generated when there is no contact between the read/write head assembly and the storage medium. The no-contact modulation depth z 716 from modulation depth memory 720 is then used to update the estimate of probability density function parameters 732 during operation. In some embodiments, the estimate of probability density function parameters 732 can be cleared during operation by a clear signal 730, allowing the constant false alarm resonance detector 700 to track slow variations in noise by clearing previous estimates that were tailored to previous noise conditions. In some embodiments, the threshold can be initially set a default level and subsequently updated using no-contact modulation depth z 716 from modulation depth memory 720, without using training data 726.

In some embodiments which apply a Gaussian fitting in probability density function parameter estimator 724, the Gaussian distribution p (z) is determined by estimates of two parameters, the mean $\mu$ and the variance $\sigma^2$:

$$p(z) = \frac{1}{\sqrt{2\pi\sigma^2}} e^{-\frac{(z-\mu)^2}{2\sigma^2}} \quad \text{(Eq 9)}$$

where the estimated mean $\hat{\mu}$ is:

$$\hat{\mu} = 1/P \sum_{i=1}^{P} z_i \quad \text{(Eq 10)}$$

and the estimated variance $\hat{\sigma}^2$ is:

$$\hat{\sigma}^2 = 1/P \sum_{i=1}^{P} (z_i - \hat{\mu})^2 \quad \text{(Eq 11)}$$

The estimate of probability density function parameters 732 are provided to a threshold calculator 734, which is operable to calculate the threshold 712 and provide it to modulation depth comparator 710 for detection, based on the parameter estimates. For the embodiments using a Gaussian fitting, the estimate of probability density function parameters 732 include the estimated mean $\hat{\mu}$ and estimated variance $\hat{\sigma}^2$. A false alarm rate signal 736 provides a performance request allowing a user to specify the desired false alarm rate. For example, using the false alarm rate signal 736, a user or designer can request fewer false alarms at the risk of more missed contact detections, or more false alarms with fewer missed detections.

The threshold 712 is computed by threshold calculator 734 based on the probability of false alarm $P_{false}$ according to the selected probability density function fitting. The probability of false alarm $P_{false}$ given a Gaussian fitting is:

$$P_{false} = \int_T^\infty \frac{1}{\sqrt{2\pi\sigma^2}} e^{-\frac{(x-\mu)^2}{2\sigma^2}} dx = \quad \text{(Eq 12)}$$

$$\int_{\frac{T-\mu}{\sigma}}^\infty \frac{1}{\sqrt{2\pi}} e^{-\frac{x^2}{2}} dx = \Phi\left(\frac{T-\mu}{\sigma}\right) = \frac{1}{2} - \frac{1}{2}\text{erf}\left(\frac{T-\mu}{\sqrt{2}\,\sigma}\right)$$

The threshold T is thus:

$$T=\sqrt{\sqrt{2}}\sigma\text{erf}^{-1}(1-2P_{false})+\mu \quad \text{(Eq 13)}$$

where $$\text{erf}(x) = \int_0^x \frac{2}{\sqrt{\pi}} e^{-t^2} dt \quad \text{(Eq 14)}$$

Because the error function erf(x) involves an integral, its computation is complex and its inverse does not exist. In some embodiments, the threshold calculator 734 uses the following approximation to compute erf(x), although it is not limited to any particular method of computation or approximation:

$$\text{erf}(x) \approx \text{sgn}(x)\sqrt{1 - \exp\left(-x^2 \frac{\frac{4}{\pi} + ax^2}{1 + ax^2}\right)} \quad \text{(Eq 15)}$$

where $$a = \frac{8(\pi-3)}{3\pi(4-\pi)} \approx 0.140012.$$

A simplified inverse of the approximation for error function erf(x) used in some embodiments of the threshold calculator 734 is:

$$\text{erf}^{-1}(x) \approx \quad \text{(Eq 16)}$$

$$\text{sgn}(x)\sqrt{\sqrt{\left(\frac{2}{a\pi} + \frac{\ln(1-x^2)}{2}\right)^2 - \frac{\ln(1-x^2)}{a}} - \left(\frac{1}{a\pi} + \frac{\ln(1-x^2)}{2}\right)}$$

and because the modulation domain is [0,1] for the constant false alarm resonance detector 700, the sgn(x) function can be neglected in the threshold calculator 734.

In some embodiments which apply a skew normal estimator in probability density function parameter estimator 724, the skew normal probability density function $f(x)$ is determined based on estimates of three parameters, the mean $\mu$, the variance $\sigma^2$ and the skewness $\gamma_3$:

$$f(x) = \frac{2}{\omega}\phi\left(\frac{x-\xi}{\omega}\right)\Phi\left(a\left(\frac{x-\xi}{\omega}\right)\right) \quad \text{(Eq 17)}$$

where the estimated mean $\hat{\mu}$ is numerically calculated according to Equation 10, the estimated variance $\hat{\sigma}^2$ is numerically calculated according to Equation 11, and the estimated skewness $\hat{\gamma}_3$ is numerically calculated as:

$$\hat{\gamma}_3 = \frac{\frac{1}{P}\sum_{i=1}^{P}(z_i - \hat{\mu})^3}{\hat{\sigma}^3} \quad \text{(Eq 18)}$$

The theoretical expression for the mean μ is:

$$\xi + \omega\delta\sqrt{\frac{2}{\pi}} \quad \text{(Eq 19)}$$

where $$\delta = \frac{\alpha}{\sqrt{1+\alpha^2}}.$$

The theoretical expression for the variance $\sigma^2$ is:

$$\omega^2\left(1 - \frac{2\delta^2}{\pi}\right) \quad \text{(Eq 20)}$$

The theoretical expression for the skewness $\gamma_3$ is:

$$\gamma_3 = \frac{4-\pi}{2}\frac{\left(\delta\sqrt{2/\pi}\right)^3}{(1-2\delta^2/\pi)^{3/2}} \quad \text{(Eq 21)}$$

By equalizing the theoretical and numerical moments, the parameters $\hat{\omega}^2$, $\alpha$ and $\hat{\xi}$ can be estimated by moment matching in the probability density function parameter estimator 724 to be provided to threshold calculator 734 as probability density function parameters 732, where the parameters are calculated as:

$$\hat{\omega}^2 = \frac{\hat{\sigma}^2}{1 - 2\hat{\delta}^2/\pi} \quad \text{(Eq 22)}$$

$$\hat{\alpha} = \hat{\delta}\sqrt{1-\hat{\delta}^2} \quad \text{(Eq 23)}$$

$$\hat{\xi} = \hat{\mu} - \hat{\omega}\hat{\delta}\sqrt{\frac{2}{\pi}} \quad \text{(Eq 24)}$$

The threshold 712 is computed by threshold calculator 734 based on the probability of false alarm $P_{false}$ according to the selected probability density function fitting. The probability of false alarm $P_{false}$ given a skew normal fitting is:

$$P_{false} = 1 - \Phi\left(\frac{T-\xi}{\omega}\right) - O\left(\frac{T-\xi}{\omega}, \alpha\right) \quad \text{(Eq 25)}$$

where $$O\left(\frac{T-\xi}{\omega}, \alpha\right)$$

is the Owen's function.

Because the threshold T 712 cannot be exactly obtained in this case, a partition algorithm is applied in threshold calculator 734 to compute it based on the false alarm rate signal 736. A first threshold T1 is generated such that $P_{false}(T1) > P_{false\_desired}$, where $P_{false\_desired}$ is the desired false alarm probability specified by false alarm rate signal 736. A second threshold T2 is generated such that $P_{false}(T2) < P_{false\_desired}$. A third threshold T3 is set at the average of the first and second thresholds, or T3=0.5*(T1+T2). The probability $P_{false}(T3)$ is calculated, and if $P_{false}(T^3) > P_{false-desired}$, first threshold T1 is set equal to third threshold T3. If, on the other hand, $P_{false}(T^3) < P_{false\_desired}$, second threshold T2 is set equal to third threshold T3. The process continues by averaging the first and second thresholds and continuing from that point. The partition algorithm thus focuses in on the threshold that results in the desired false alarm probability specified by false alarm rate signal 736. The partition algorithm can be stopped at a user-defined accuracy criterion. For example, in some embodiments, if the absolute value of T1–T2 is less than a certain value, the algorithm is finished.

Figure 8:
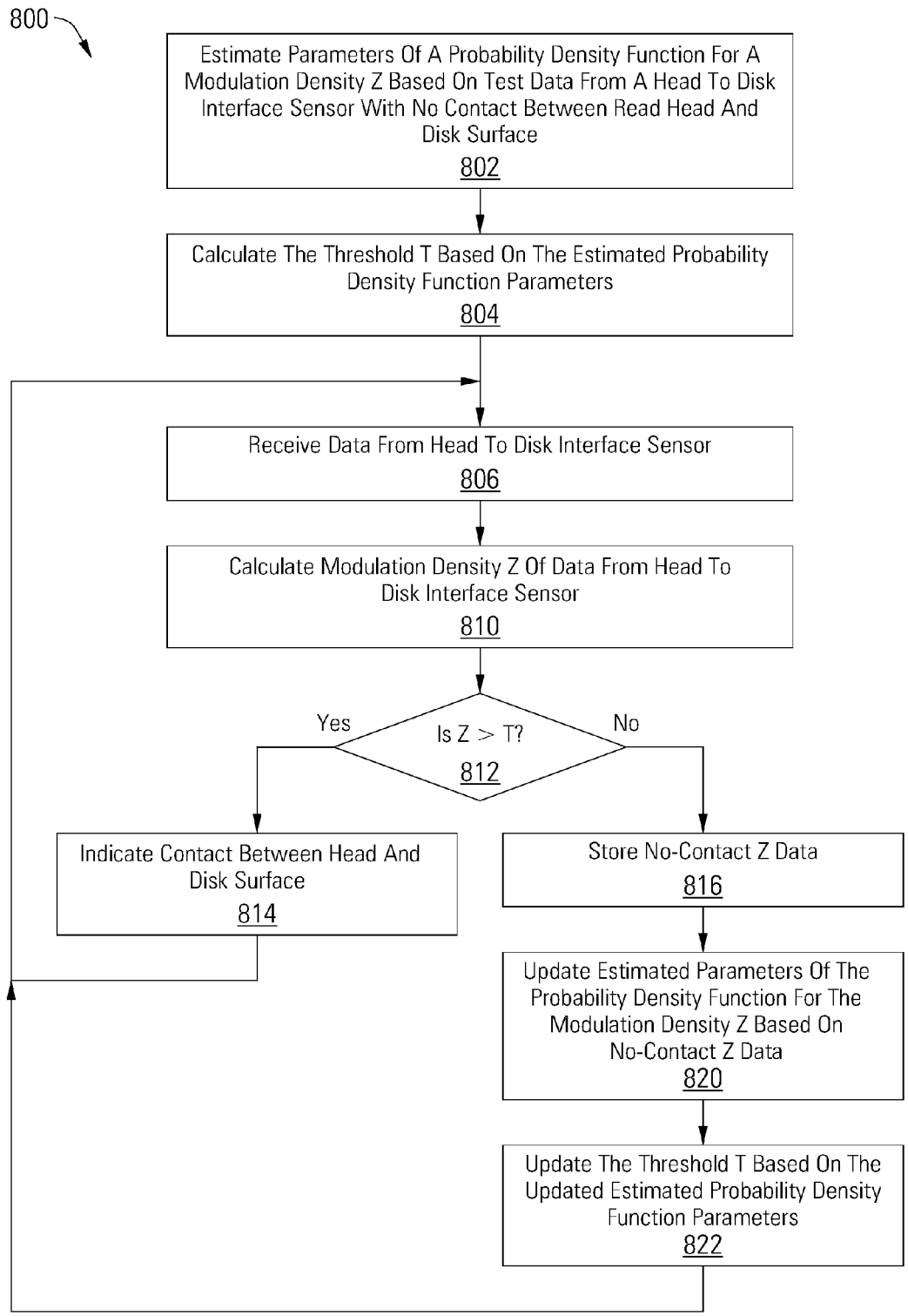
FIG. 8 is a flow diagram showing a method for detecting contact between a head assembly and a storage medium in accordance with some embodiments of the present invention.

Turning now to FIG. 8, a flow diagram 800 shows a method for detecting contact between a head assembly and a storage medium in accordance with some embodiments of the present invention. Following flow diagram 800, the parameters of a probability density function are estimated for a modulation density Z based on test data from a head to disk interface sensor with no contact between read head and disk surface. (Block 802) The parameters can be estimated using any distribution fitting, such as, but not limited to, a Gaussian distribution fitting according to Equations 9-11 or a skew normal distribution fitting according to Equations 17-24. A threshold T is calculated based on the estimated probability density function parameters. (Block 804) When using a Gaussian distribution fitting, this can be performed according to Equations 12-16. When using a skew normal distribution fitting, this can be performed according to Equation 25 and the partition algorithm disclosed above.

Data is received from a head to disk interface sensor. (Block 806) The modulation density Z of data from the head to disk interface sensor is calculated. (Block 810) In some embodiments, this is performed according to Equations 4-5. A determination is made as to whether the modulation density Z is greater than threshold T. (Block 812) If so, the constant false alarm resonance detector indicates contact between the read head and disk surface. (Block 814) Otherwise, if Z is less than T, the no-contact Z data is stored for use in updating the threshold value. (Block 816) The estimated parameters of the probability density function for the modulation density Z are updated based on the no-contact Z data. (Block 820) The threshold T is updated based on the updated estimated probability density function parameters. (Block 822) The process continues as more data is received from the head to disk interface sensor. (Block 806)

It should be noted that the various blocks shown in the drawings and discussed herein can be implemented in integrated circuits along with other functionality. Such integrated circuits can include all of the functions of a given block, system or circuit, or a subset of the block, system or circuit. Further, elements of the blocks, systems or circuits can be implemented across multiple integrated circuits. Such integrated circuits can be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein can be implemented in either software or firmware. In some such cases, the entire system, block or circuit can be implemented using its software or firmware equivalent. In other cases, the one part of a given system, block or circuit can be implemented in software or firmware, while other parts are implemented in hardware.

In conclusion, the present invention provides novel sync mark systems and methods for detecting contact between a head assembly and a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A contact detection system comprising:
    a comparator operable to compare a signal derived from a contact sensor with a threshold and to indicate contact when the signal is greater than the threshold;
    a parameter estimation circuit operable to estimate parameters of a probability density function based on the signal derived from the contact sensor;
    a threshold calculator operable to calculate the threshold based at least in part on the parameters of the probability density function.

2. The contact detection system of claim 1, wherein the parameter estimation circuit is operable to estimate the parameters of a probability density function based on only a portion of the signal derived from the contact sensor obtained without contact.

3. The contact detection system of claim 1, wherein the parameter estimation circuit is operable to estimate parameters of the probability density function using a Gaussian fitting.

4. The contact detection system of claim 3, wherein the parameters comprise a mean and a variance of a modulation density.

5. The contact detection system of claim 1, wherein the parameter estimation circuit is operable to estimate parameters of the probability density function using a skew normal fitting.

6. The contact detection system of claim 5, wherein the parameters comprise a mean and a variance and a skewness of a modulation density.

7. The contact detection system of claim 1, wherein the signal derived from the contact sensor comprises a modulation density.

8. The contact detection system of claim 7, further comprising a modulation depth calculator operable to calculate the modulation density based on digital samples of an analog signal from the contact sensor.

9. The contact detection system of claim 8, wherein the modulation depth calculator is operable to calculate the modulation density based on segmented sums of the digital samples.

10. The contact detection system of claim 8, further comprising a memory, wherein the comparator is operable to store the modulation density in the memory when the modulation density is less than the threshold.

11. The contact detection system of claim 1, wherein the parameter estimation circuit is further operable to estimate the parameters of the probability density function based on training data from a training data input.

12. The contact detection system of claim 1, wherein the parameter estimation circuit is further operable to reset the parameters of the probability density function to default values based on a clear input signal.

13. The contact detection system of claim 1, wherein the threshold calculator is operable to calculate the threshold based at least in part on a false alarm rate request signal.

14. A storage device comprising:
a storage medium;
a read/write head assembly disposed in relation to the storage medium, wherein the read/write head assembly includes a read head to disk interface sensor operable to provide a sensor output indicating contact between the read/write head assembly and the storage medium; and
a contact detector operable to compare a signal derived from the sensor output with a threshold to determine when the read/write head assembly contacts the storage medium, and further operable to calculate a value for the threshold by fitting a distribution to a probability density function of the signal derived from the sensor output.

15. The storage device of claim 14, wherein the contact detector is operable to compute the signal derived from the sensor output as a modulation density of segmented sums of digital samples of the sensor output.

16. The storage device of claim 14, wherein the distribution is selected from a group consisting of a Gaussian distribution and a skew normal distribution.

17. A method for detecting contact between a read head and a storage medium, comprising:
comparing a signal derived from a head to disk interface sensor with a threshold and indicating contact between a read head and a disk surface when the signal is greater than the threshold;
estimating parameters of a probability density function of portions of the signal derived from the head to disk interface sensor with no contact between the read head and the disk surface; and
calculating the threshold based at least in part on the parameters.

18. The method of claim 17, wherein the threshold is calculated based in part on a false alarm rate request signal.

19. The method of claim 17, wherein the parameters of the probability density function are calculated using a Gaussian fitting of a modulation depth.

20. The method of claim 17, wherein the parameters of the probability density function are calculated using a skew normal fitting of a modulation depth.

* * * * *